United States Patent [19]

Liu et al.

[11] Patent Number: 4,535,542

[45] Date of Patent: Aug. 20, 1985

[54] VERNIER GAUGE

[76] Inventors: Bao-Shen Liu; Bao-Horng Liu, both of 3rd Fl., No. 20, Alley 6, Lane 190, Chung 12th Rd., Tien Mu District, Taipei, Taiwan

[21] Appl. No.: 544,467

[22] Filed: Oct. 24, 1983

[51] Int. Cl.³ ................................................ G01B 3/38
[52] U.S. Cl. .................... 33/148 E; 33/403; 33/452
[58] Field of Search ............ 33/143 R, 149 R, 148 E, 33/452, 454, 455, 465, 403

[56] References Cited

U.S. PATENT DOCUMENTS

| | | | |
|---|---|---|---|
| 1,299,978 | 4/1919 | MacDowney | 33/148 E |
| 1,539,422 | 5/1925 | Lundquist | 33/148 E |
| 3,333,343 | 8/1967 | Elfast, Jr. | 33/143 R |
| 4,097,997 | 7/1978 | Bjornson | 33/148 E |

FOREIGN PATENT DOCUMENTS 104201  2/1981  Japan ................. 33/137 R

*Primary Examiner*—Willis Little
*Attorney, Agent, or Firm*—McCormick, Paulding & Huber

[57] ABSTRACT

A vernier gauge has three arc members, two flat pieces and two sliding pieces. A second arc member is slidably engaging with a first arc side of a first arc member from a first end of the first arc member and a third arc member is slidably engaging with a second arc side of the first arc member from a second end of the first arc member. Each of two free ends of the second and third arc members is actively attached one of the two flat pieces each of which is slidably engaged with one of the two sliding pieces. The second, third arc members and the two flat pieces are provided with main scales and the first arc member and the two sliding pieces are provided with corresponding vernier scales. Each of the two sliding pieces is further provided with two opposite tips and a flat surface. Such gauge can permit accurately fractional readings of angles as well as inner or outer diameters of objects and of depths of objects when the flat piece is solely used.

24 Claims, 14 Drawing Figures

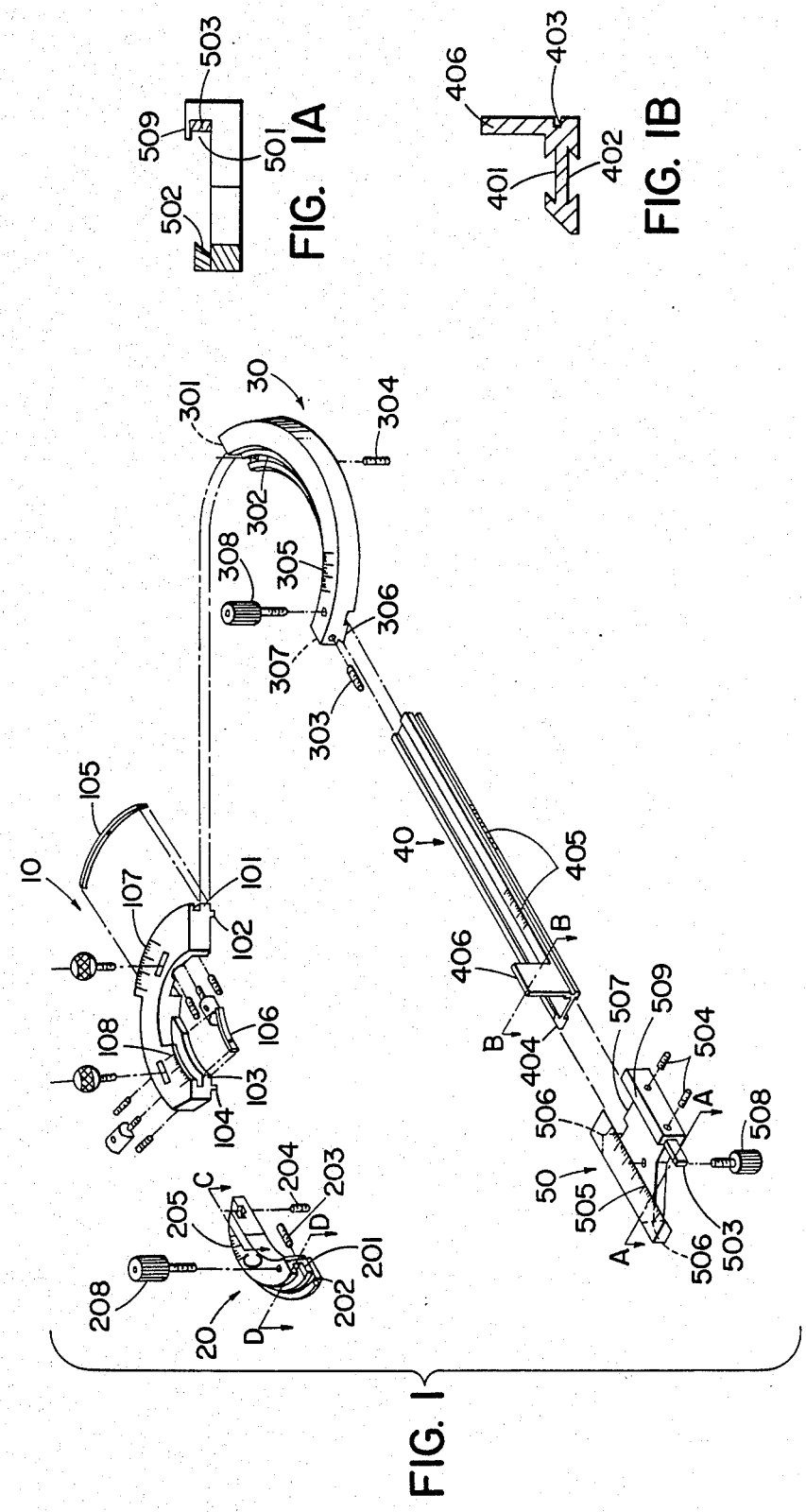

VERNIER GAUGE

BACKGROUND OF THE INVENTION

The present invention relates to a vernier gauge, and more particularly to a gauge having arc members in sliding engagement capable of accurately fractional readings of angles.

The known protractors used at present time are only capable of degree indexing and are incapable of accurately constructing an angle on an object, especially an object of irregular outer appearance having a cylindrical hollow portion from the center of the cylindrical hollow portion.

It is therefor tried by the applicant to provide a vernier gauge capable of accurately constructing and indexing an angle on an object.

SUMMARY OF THE INVENTION

According to the present invention, a vernier gauge comprises a first arc member and a second arc member which is slidably engaged with the first arc member and is provided with a first scale so that the stretched angle between the two free ends of the first and second arc members can be read from the first scale.

Preferably, the second arc member is slidably engaging with a first arc side of the first arc member which is further provided with a first vernier scale placed along the first scale to permit accurate fractional reading.

For protracting the stretched angle, each of the two free ends of the first and second arc members is attached a flat piece.

Preferably, the flat piece is a ruler provided with a second scale and is capable of moving radially with respect to the arc members along its corresponding free end.

For auxiliary purposes, each of the flat piece is slidably engaged a sliding piece which is provided with a second vernier scale placed along the second scale.

The sliding piece can include two opposite tips so that the corresponding tips of the two sliding pieces engaged with the two flat pieces can be contacted to measure the inner or outer diameters of a circular object when the arc members are slid to set the two flat pieces attached on the two free ends of the arc members to be in alignment.

Preferably, each of the two flat pieces includes a counter stop piece.

For alleviating the friction of the sliding action between the arc members, between the first and second arc members there is provided with a slip piece.

For retaining the slip piece, a first screw is radially and outwardly screwed into the first arc member and is projecting an end from the first arc side into an indentation of the slip piece for preventing the slip piece from moving, a second screw is radially and outwardly screwed into the first arc member for urging the slip piece and a controlling piece engages with a head of the second screw so that the second screw urges the slip piece so tightly as to lock the sliding action between the arc members when the controlling piece is turned in a first direction and permits the sliding action when the controlling piece is turned in a second direction opposite to the first direction.

Preferably, a third arc member which is provided with a third scale is introduced so that the second arc member is slidably engaging with a first arc side of the first arc member from a first end of the first arc member and the third arc member is slidably engaging with a second arc side of the first arc member from a second end of the first arc member and the stretched angle between the two free ends of the second and third arc members can be read from the first and third scales.

To permit accurate fractional reading, the first arc member is provided with a first vernier scale and a third vernier scale placed along the first and the third scales respectively.

The flat pieces, the sliding pieces and the counter stop pieces can also be utilized in such three arc members type by suitable arrangements.

The slip piece is also recommended to be used in the manner suggested in the two arc members type except the other one is desired to mount between the first and third arc members.

For the same sake, there is provided with a straight slip piece between each flat piece and its engaged sliding piece.

The movable attachment between each flat piece and its corresponding free end can be achieved by dovetailing engagement.

The slidably engaging relation between the arc members can be achieved by providing radial and axial slim projections on the first arc member and corresponding grooves to engage the radial and axial slim projections on the second and third arc members.

Preferably, each of three arc members has an arc slightly smaller than 180°.

More preferably, each sliding piece is provided with a flat surface so that the flat surface can be contacted to measure the depth of an object when each flat piece is detached from its corresponding free end.

Certainly, another flat piece can act as a spare of the present gauge and which can be made of plastic material and be provided with different systems of scales and have a straight indentation through its one side of bottom surface for prohibiting the contamination of ink.

In practice, the first vernier scale is to permit 0.05° fractional reading and the third vernier scale 0.02°.

It is therefore an object of the present invention to provide a vernier gauge capable of accurately constructing and indexing an angle.

It is another object of the present invention to provide a vernier gauge capable of inner and outer diameters measuring.

It is further an object of the present invention to provide a vernier gauge capable of inner and outer distances measuring.

It is yet an object of the present invention to provide a vernier gauge capable of depth detecting.

These and other advantages of the present invention may best be understood with reference to the drawings, in which:

BRIEF DESCRIPTION OF THE DRAWINGS

FIG. 1 is an exploded view showing the main fittings of a vernier gauge of the present invention;

FIG. 1A is a sectional view for better showing a sliding piece of the present invention;

FIG. 1B is a sectional view for better showing a flat piece of the present invention;

FIG. 1C is a sectional view for better showing a second arc member from an end;

FIG. 1D is a sectional view for better showing the second arc member from an another end;

FIG. 1E is a front elevational view of the another end of the second arc member of the present invention;

DETAILED DESCRIPTION OF THE PREFERRED EMBODIMENT

Figure 2A:
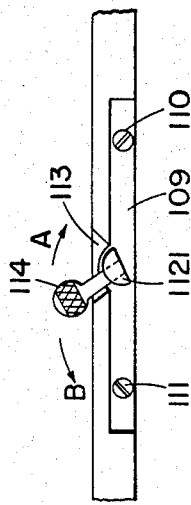
FIG. 2A is a schematic view showing how a controlling piece controls a slip piece of a vernier gauge of the present invention.

Referring now to FIG. 1, there is shown an exploded view of a vernier gauge which includes a first arc member 10, a second arc member 20, a third arc member 30, two flat pieces 40 and two sliding pieces 50 and only one set of flat piece and sliding piece is shown. First arc member 10 has radial slim projections 101, 103, axial slim projections 102, 104, slip pieces 105, 106, vernier scales 107, 108. Second arc member 20 has corresponding radial groove 201 and axial groove 202 to slidably engage with slim projections 103 and 104 respectively. Two screws 203, 204 are screwed into second arc member 20 and project on grooves 201, 202 respectively for limiting the slidable range of arc member 20 on arc member 10 when arc member 20 has slidingly fitted to arc member 10. A main scale 205 on second arc member 20 is provided so that scales 205, 108 will permit accurate fractional reading when arc members 10, 20 are fitted. Third arc member 30 has corresponding radial groove 301 and axial groove 302 to slidably engage with slim projections 101, 102 respectively. Two screws 303, 304 are screwed into third member 30 and project on grooves 301, 302 respectively for limiting the slidable range of arc member 30 on arc member 10 when arc member 30 has slidingly fitted to arc member 10. A main scale 305 on third arc member 30 is provided to place along vernier scale 107 when arc members 10, 30 are fitted in order to permit accurate fractional reading.

Figure 2:
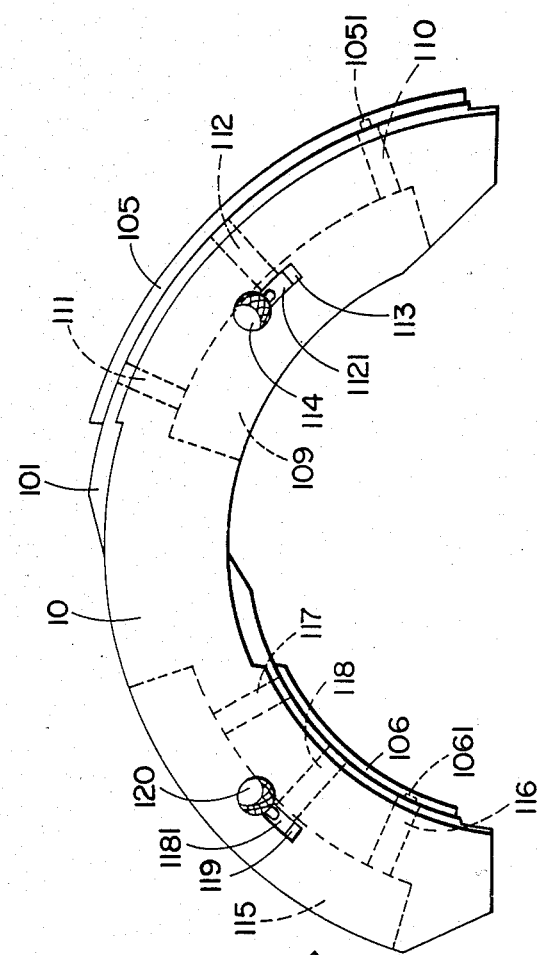
FIG. 2 is a top view showing a first arc member of a vernier gauge of the present invention.

Slip pieces 105, 106 are provided between arc members 10, 30 as well as arc members 10, 20 respectively for alleviating the friction of the sliding action between the arc members and the way the slip pieces are provided is shown in FIG. 2. First arc member 10 has a lower cavity 109 from where three screws 110, 111, 112 are radially screwed into arc member 10. Screw 110 projects an end from the outer arc surface of radial projection 101 into an indentation 1051 of slip piece 105 to prevent slip piece 105 from moving when arc members 10, 30 are slidingly engaging. Screw 111 is provided so that screws 110, 111 can be further screwed to push slip piece 105 within radial groove 301 and in contact with arc member 30 when slip piece 105 is abraded. Screw 112 is provided to have a head 1121 and arc member 10 has a hole 113 at the top. A controlling piece 114 is threaded into head 1121 through hole 113. As shown in the schematic view of FIG. 2A, controlling piece 114 screws down screw 112 to free the slide of arc members 10, 30 when controlling piece 114 is urged to go in direction B and screws up screw 112 for upholding slip piece 105 to lock the slide between arc members 10, 30 when controlling piece 114 is urged to go in direction A. The other cavity 115, three screws 116, 117, 118, hole 119, controlling piece 120 and head 1181 of screw 118 of arc member 10, in the way substantially similar to that of the above described, actuate the indentation 1061 of slip piece 106 and slip piece 106 itself between arc members 10, 20.

Referring back to FIG. 1, two dovetailed projections 206, 306 are provided on two free ends of second and third arc members respectively to engage with two flat pieces respectively. The flat piece 40 has a corresponding groove 401 to slidably engage with projection 306 (206, in second arc member) and a screw 308 (208) screwed into third (second) arc member 30 (20) is set to fix flat piece 40. With such two engaged flat pieces, one can construct and protract the stretched angle between the two free ends of arc members 20, 30. Flat piece 40 is also provided with a first main scale 404 and a second main scale 405 and a basic line 307 (207, in second arc member 20, is better shown) on third arc member can check scales 404, 405. Above basic line 307, there is provided a number to show the distance between line 307 and the center of arc members. A dovetailed groove 402 is provided on the back of flat piece 40 which is thus capable of inversively engaging with projection 306. A sliding piece 50 provided with a vernier scale 505 has grooves 501, 502 to slide on flat piece 40 in order to allow accurate fractional reading. A straight slip piece 503 in groove 501 is provided for alleviating the friction between pieces 40, 50 and is secured by two screws 504. For better engagement, the projection 509 on sliding piece engages with a straight slot 403 on flat piece 40 and a screw 508 is set to fix sliding piece 50 on flat piece 40. Flat piece 40 is attached a rectangular counter stop piece 406 so that the two counter stop pieces attached on the two flat pieces can be contacted to measure the inner or outer distances of two objects when arc member 10, 20 and 30 are slid to set the two flat pieces in straight alignment. Two opposite tips 506 are provided on sliding piece 50 so that the respective tips of the two sliding pieces on the two flat pieces can be contacted to measure the inner or outer diameters of a circular object.

Certainly, the top surface of projection 509 can be provided with another vernier scale to place along second main scale 405.

Figure 6:
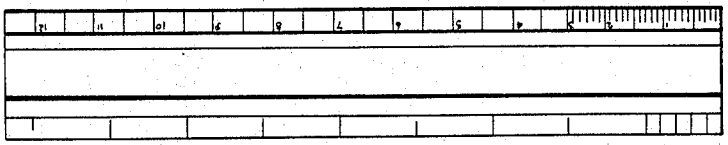
FIG. 6 is a spare flat piece of a vernier gauge of the present invention.
Figure 4A:
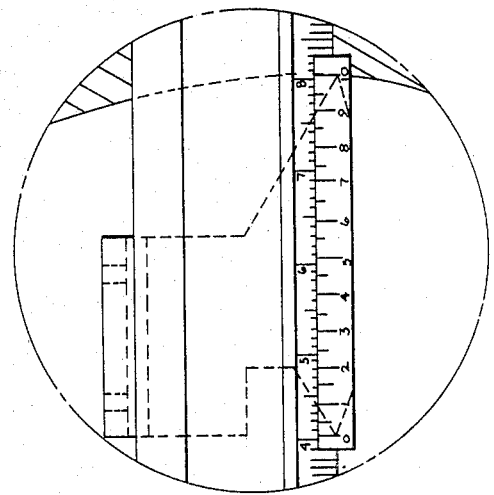
FIG. 4A is an enlarged view for better showing the relation of scales on a flat and a sliding pieces of the present invention.
Figure 6A:
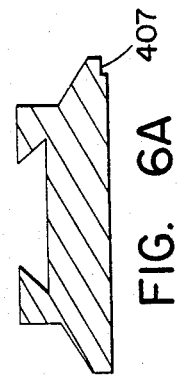
FIG. 6A is a sectional view of the spare flat piece of the present invention.

A flat surface 507 on sliding piece 50 may be contacted to assist in one's depth detecting when flat piece 40 is detached from the corresponding free end of arc members. If, a third flat piece of plastics is desired to act as a spare, a straight indentation 407 on one side of the bottom surface of the third flat piece, as shown in FIGS. 6 & 6A, is equipped to prohibit the contamination of ink.

Figure 3:
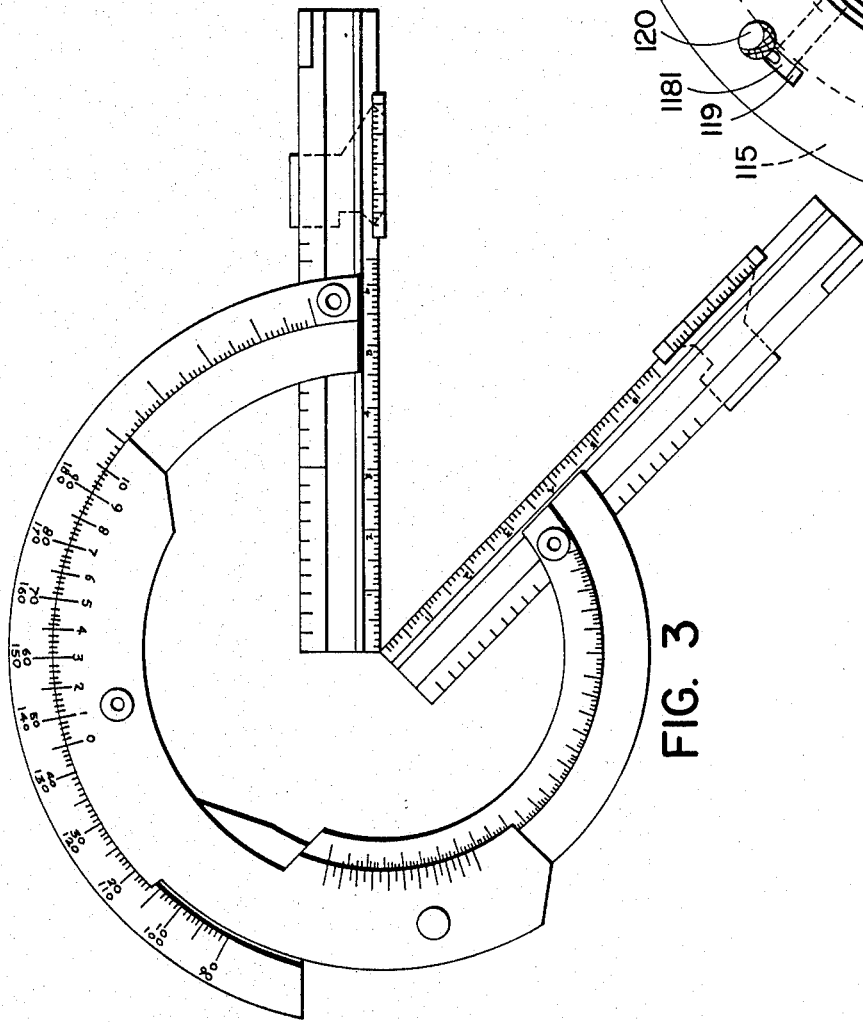
FIG. 3 is a plan view showing an assembled vernier gauge of the present invention.
Figure 4:
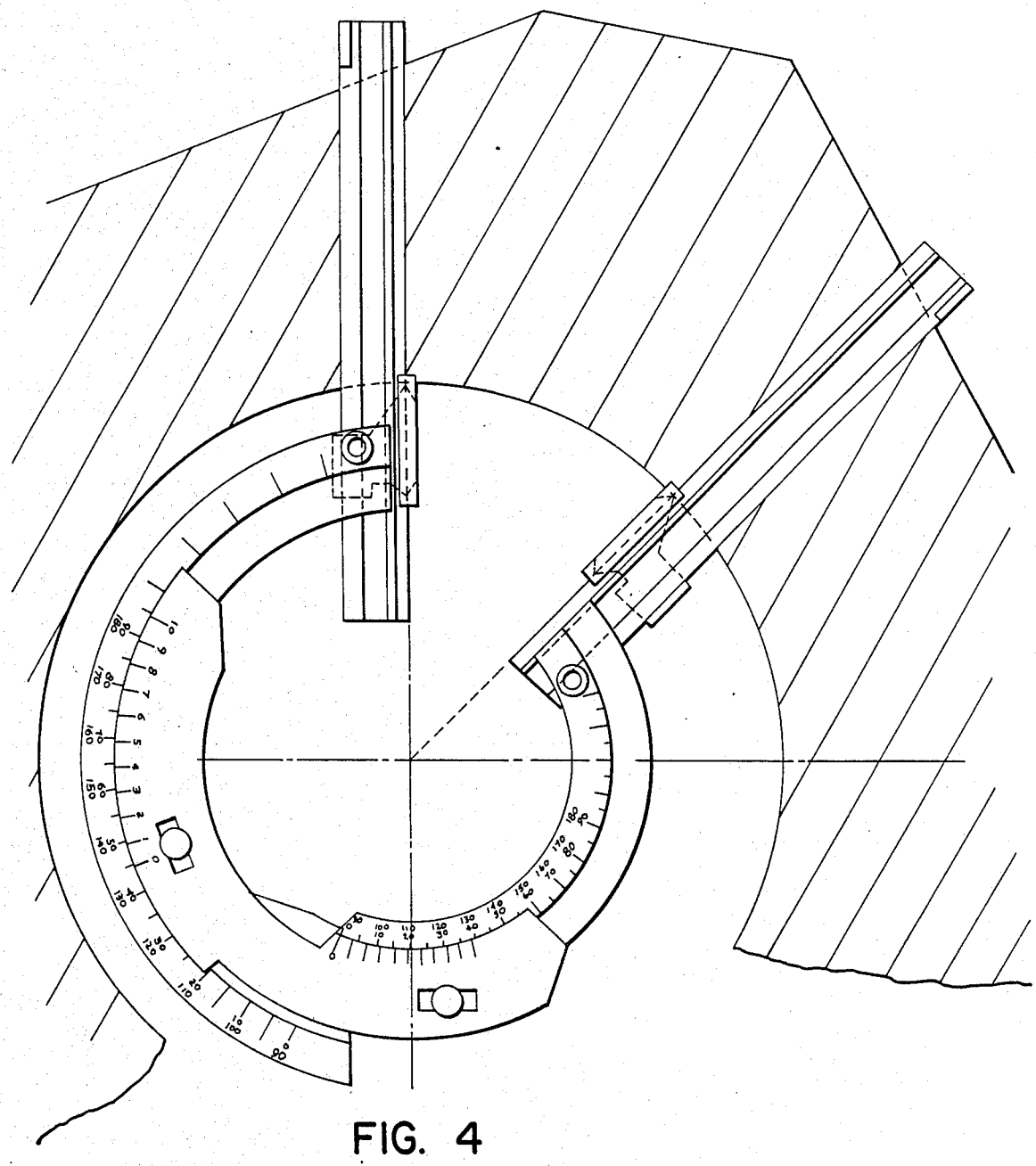
FIG. 4 is a schematic view showing a vernier gauge which contructs an angle from the center of a cylindrical hollow portion of an object.
Figure 5:
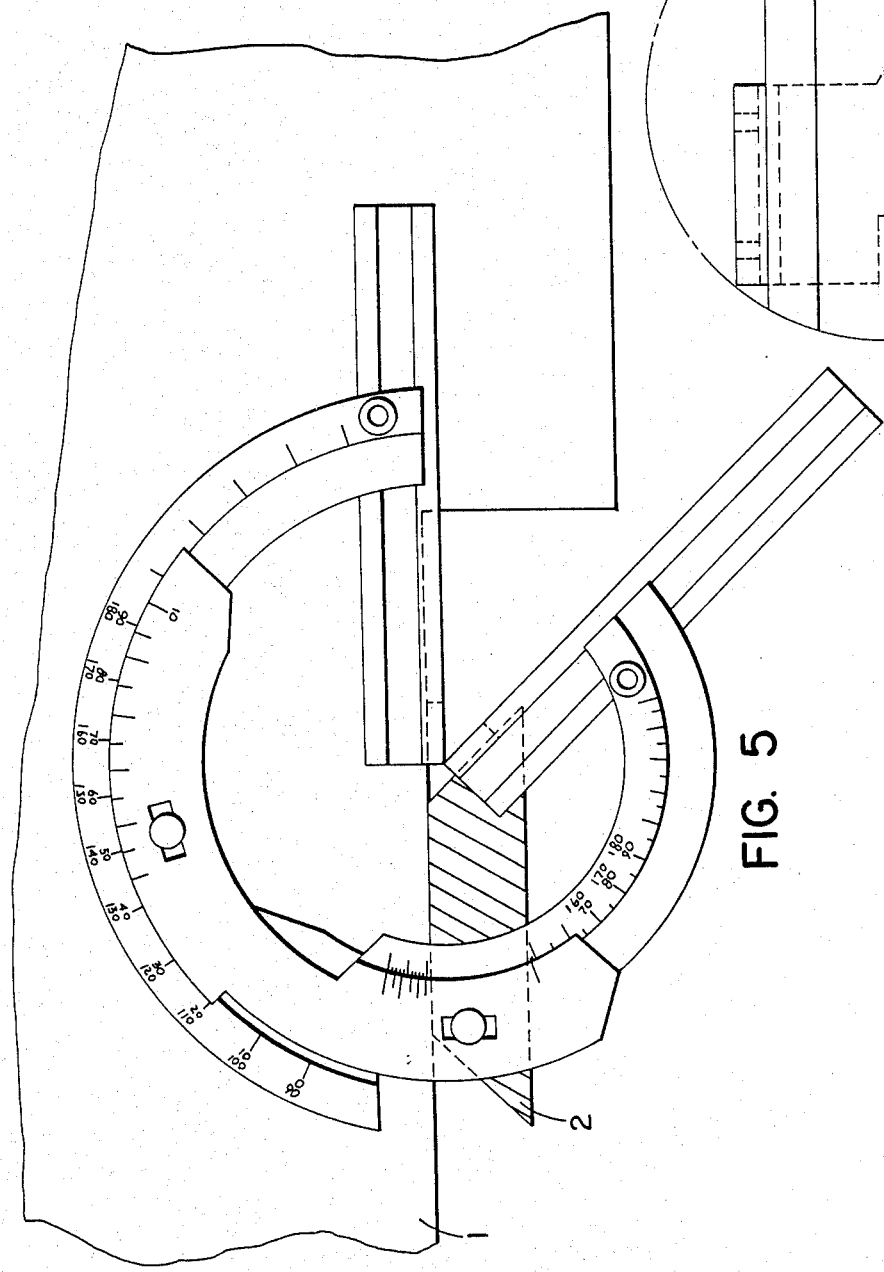
FIG. 5 is a schematic view showing that a vernier gauge measures an angle of a bulge lower than a base plane of an object.

In FIG. 3, there is shown a plan view of a vernier gauge stretching an angle of 45°. As shown in the figure, the two flat pieces slide to contact at the center of the arc members. In FIG. 4, there is shown a vernier gauge of the present invention which contructs an angle from the center of a cylindrical hollow portion of an object having an irregular outer periphery. In FIG. 5, an object has a base plane 1 and a bulge 2 resided in a plane lower than base plane 1 and the vernier gauge measures the angle constituted by bulge 2 and base plane 1.

While the present invention has been described in connection with what is presently considered to be the most practical and preferred embodiment, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What I claim is:

1. A vernier gauge comprising:
a first arc member having a free end and a clamped end; and said first arc member having radially inner and outer sides, a second arc member also having a free end and a clamped end as well as inner and outer sides, said second arc member slidably engaged with said first arc member and provided with a first scale, said first and second arc members defining a free space at the center, whereby the stretched angle between the two free ends of said first and second arc members can be read from said first scale and wherein a first vernier scale on said second arc member is placed along said first scale to permit accurate fractional reading.

2. A vernier gauge according to claim 1 wherein a flat piece is attached to each of said two free ends of said first and second arc members for protracting said stretched angle.

3. A vernier gauge according to claim 2 wherein said flat piece is a ruler provided with a second scale and is capable of moving radially with respect to said arc members along the corresponding free end.

4. A vernier gauge according to claim 3, further comprising a sliding piece slidably engaged with said flat piece and provided with a second vernier scale placed along said second scale.

5. A vernier gauge according to claim 4 wherein said sliding piece includes two tips having different faced orientations
whereby when said arc members are slid to set the two flat pieces attached on said two free ends of said arc members to be in alignment the corresponding tips of the two sliding pieces engaged with said two flat pieces can be contacted to measure the inner and outer diameters of a circular object.

6. A vernier gauge according to claim 5 wherein each of said two flat pieces includes a counter stop piece.

7. A vernier gauge according to claim 6, further comprising a slip piece provided between said first and second arc members for alleviating the friction of the sliding action between said arc members.

8. A vernier gauge according to claim 7 wherein said slip piece has an indentation and in which said vernier gauge further includes
a first screw radially and outwardly screwed into said first arc member and projecting an end from said first arc side into said indentation for preventing said slip piece from moving;
a second screw radially and outwardly screwed into said first arc member for urging said slip piece and having a head; and
a controlling piece engaged with said head so that said second screw urges said slip piece so tightly as to lock the sliding action between said arc members when said controlling piece is turned in a first direction and permits said sliding action when said controlling piece is turned in a second direction opposite to said first direction.

9. A vernier gauge according to claim 1 further comprising
a third arc member and in which said second arc member is slidably engaging with a first arc side of said first arc member from a first end of said first arc member and said third arc member is slidably engaging with a second arc side of said first arc member from a second end of said first arc member and said third arc member is provided with a third scale
whereby the stretched angle between the two free ends of said second and third arc members can be read from said first and third scales.

10. A vernier gauge according to claim 9 wherein said first arc member is provided with a first vernier scale placed along said first scale and a third vernier scale placed along said third scale to permit accurate fractional reading.

11. A vernier gauge according to claim 10 wherein a flat piece in attached to each of said two free ends of said second and third arc members for protracting said stretched angle.

12. A vernier gauge according to claim 11 wherein said flat piece is a ruler provided with a second scale and is capable of moving radially with respect to said arc members along its corresponding free end.

13. A vernier gauge according to claim 11 wherein each said flat piece is made of plastic material and is provided with different systems of scales and has a straight indentation through its one side of bottom surface for prohibiting the contamination of ink.

14. A vernier gauge according to claim 12, further comprising a sliding piece slidably engaged with said flat piece and provided with a second vernier scale placed along said second scale.

15. A vernier gauge according to claim 14 wherein said sliding piece includes two tips having different faced orientations
whereby when said arc members are slid to set the two flat pieces attached on said two free ends of said second and third arc members to be in alignment the corresponding tips of the two sliding pieces engaged with said two flat pieces can be contacted to measure the inner and outer diameters of a circular object.

16. A vernier gauge according to claim 15 wherein each of said two flat pieces includes a counter stop piece.

17. A vernier gauge according to claim 16, further comprising two slip piece, each of which is provided between each of said first and second as well as said first and third arc members for alleviating the friction of the sliding action between said arc members.

18. A vernier gauge according to claim 17 wherein each of said two slip pieces has an indentation and in which said vernier gauge further includes
a first screw radially and outwardly screwed into said first arc member and projecting a first screw end from said first arc side into a first indentation of one of said slip pieces for preventing said one slip piece from moving;
a second screw radially and outwardly screwed into said first arc member for urging said one slip piece and having a first screw head;

a third screw radially and inwardly screwed into said first arc member and projecting a second screw end from said second arc side into a second indentation of another one of said slip pieces for preventing said another slip piece from moving;

a fourth screw radially and inwardly screwed into said first arc member for urging said another slip piece and having a second screw head;

a first controlling piece engaged with said first screw head; and a second controlling piece engaged with said second screw head whereby said second and fourth screws urge said slip pieces so tightly as to lock the sliding action between said first and second as well as said first and third arc members when said controlling pieces are turned in a first direction and permit said sliding action when said controlling pieces are turned in a second direction opposite to said first direction.

19. A vernier gauge according to claim 18 wherein between each flat piece and its engaged sliding piece there is provided with a straight slip piece for alleviating the friction of the sliding action between said flat piece and its engaged sliding piece.

20. A vernier gauge according to claim 19 wherein each said flat piece capable of moving radially with respect to said arc members along its corresponding free end is achieved by dovetailing engagement.

21. A vernier gauge according to claim 20 wherein said slidably engaging between said arc members is achieved by providing a radial slim projection and an axial slim projection on said first arc member and by providing corresponding grooves to engage said radial and axial slim projections on one of said second and third arc members.

22. A vernier gauge according to claim 21 wherein each of said arc members has an arc slightly smaller than 180°.

23. A vernier gauge according to claim 22 wherein each sliding piece is provided with a flat surface whereby said flat surface can be contacted to measure the depth of an object when each said flat piece is detached from its corresponding free end.

24. A vernier gauge according to claim 23 wherein said first vernier scale permits 0.05° fractional reading and said third vernier scale permits 0.02° fractional reading.

* * * * *